Nov. 30, 1965
C. S. MERTLER
3,221,124
THERMOSTAT WITH ROCKING PUSH LINK
Filed Nov. 2, 1962
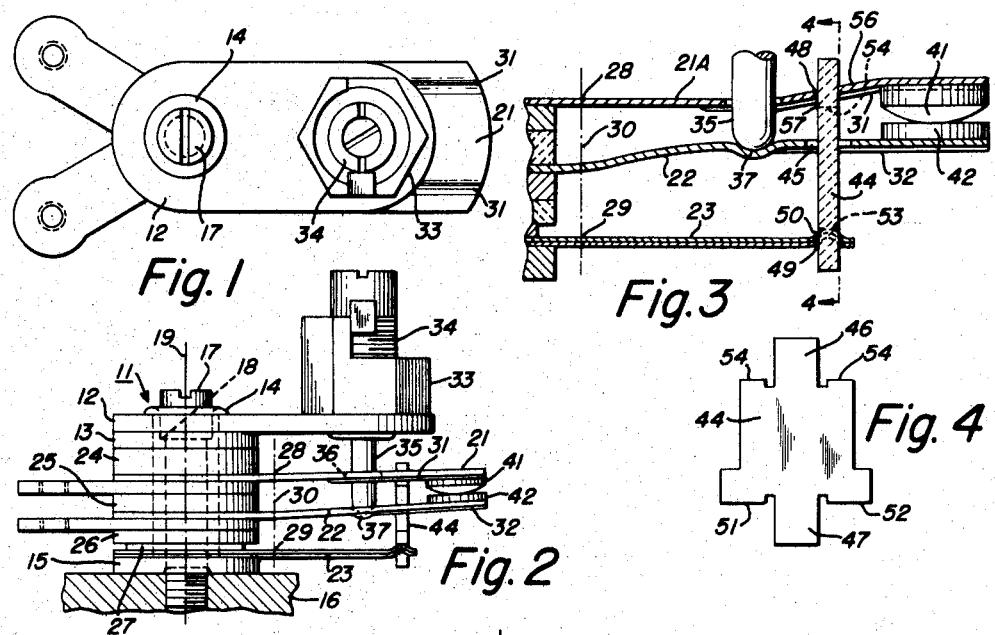
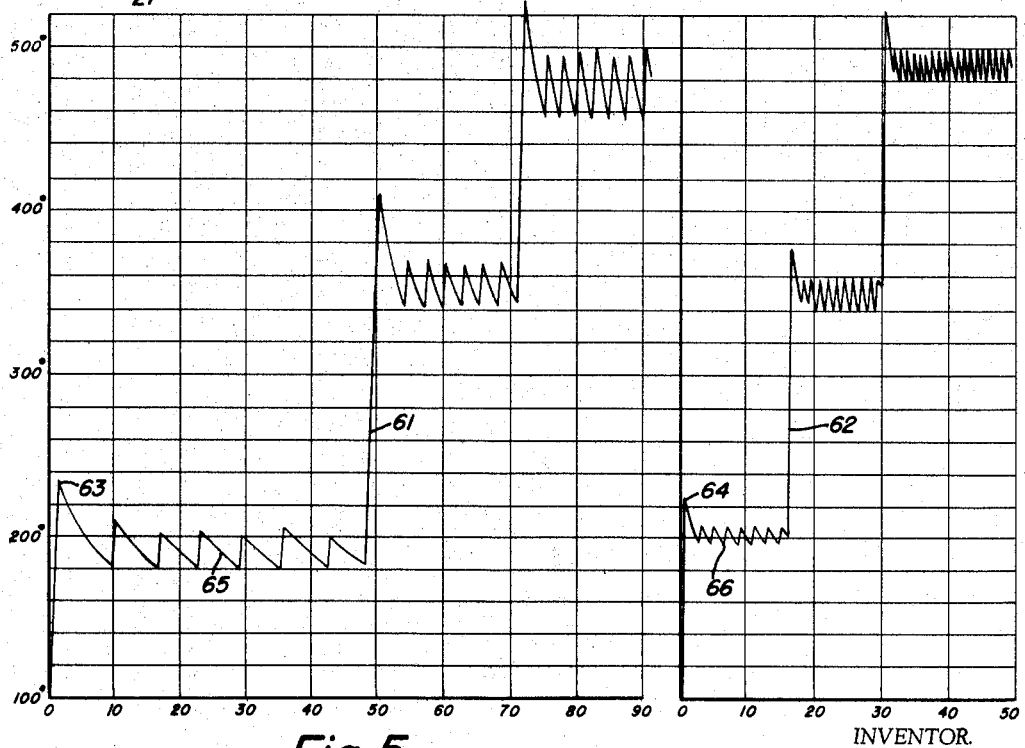
Fig. 5
INVENTOR.
Charles S. Mertler
BY Woodling, Krost,
Granger and Rust
attys.

United States Patent Office 3,221,124
Patented Nov. 30, 1965

3,221,124
THERMOSTAT WITH ROCKING PUSH LINK
Charles S. Mertler, Mansfield, Ohio, assignor to Stevens Manufacturing Company, Inc., a corporation of Ohio
Filed Nov. 2, 1962, Ser. No. 234,964
9 Claims. (Cl. 200—138)

The invention relates in general to friction-free thermostats and, more particularly, to an electrical thermostat of the creep action type wherein friction among the moving parts is eliminated.

Creep action thermostats have the advantage over snap action thermostats in generally providing a smaller temperature differential between off and on conditions. However, this is within the thermostat itself and refers to the temperature of the bimetal or thermal actuating member and in several instances, the electrical appliance being controlled by the thermostat may have a fairly large temperature differential. This temperature differential may be in the order of 50 to 60 degrees, for example, for an electrical appliance such as a flat iron. This is the temperature differential at the exposed surface of the sole plate of the iron and takes into account the thermal lag of heat transmission through the thickness of the sole plate from the heating element on the inside of the iron. This 50 to 60 degree temperature differential is quite large and is unsatisfactory for many purposes, since it may tend to overheat the article being ironed.

Also, many prior art thermostats have had a serious defect of having a rather large thermal overshoot. By this is meant when the electrical appliance such as a flat iron is first energized for a predetermined temperature, the temperature climbs rapidly to the pre-set temperature but then overshoots this mark before settling down to cycle about the mean pre-set temperature. This overshoot may be in the order of 50 to 60 degrees above the mean temperature and is caused by the thermal lag between the heating element and the bimetallic member actuating the electrical contacts plus the thermal lag from the heating element to the exterior of the sole plate, or other utilization surface of the electrical appliance.

An object of the invention is to provide a thermostat which overcomes the above described deficiencies.

Another object of the invention is to provide a friction-free thermostat which promptly moves in response to the impressed heat to actuate the contacts with a minimum of overshoot and a minimum of temperature differential between off and on conditions.

Another object of the invention is to provide a thermostat which minimizes the friction so that a thinner and more active bimetal may be utilized to thus minimize the thermal lag.

Another object of the invention is to provide a thermostat with a minimum of mass to be moved by the thermal actuator to minimize the thermal overshoot and temperature differential.

Another object of the invention is to provide a thermostat which has improved repeatability between successive cycles and between successive adjustments of temperature to the same pre-set temperature.

Another object of the invention is to provide a thermostat wherein a push link is provided between a thermal actuator and a contact blade with a line contact from the push link to each of the thermal actuator and the contact blade.

The invention may be incorporated in a thermostat which has a base carrying a bimetallic blade as a cantilever, a first movable contact is carried on the base, a second contact is carried on the base for cooperation with said first contact, a push link extends between the bimetal blade and the first contact, the bimetal blade being provided with socket aperture means and the push link being provided with tongue means engaging the socket aperture means with close tolerance in a longitudinal direction, a partially cylindrical convex surface on the bimetal blade laterally adjacent the socket aperture means engages a flat surface on the push link to establish substantially a line contact therebetween to establish a fixed length of lever arm on the bimetal blade throughout the operating range of movement thereof.

Other objects and a fuller understanding of the invention may be had by referring to the following description and claims, taken in conjunction with the accompanying drawings, in which:

FIGURE 1 is a plan view of a thermostat embodying the invention;
FIGURE 2 is a side elevational view of the thermostat of FIGURE 1;
FIGURE 3 is an enlarged longitudinal partial sectional view of a modification;
FIGURE 4 is a sectional view on line 4—4 of FIGURE 3; and,
FIGURE 5 is a graph of temperature vs. time.

The FIGURES 1 and 2 show the friction-free thermostat 11 of the invention. This invention may take several different forms and FIGURES 1 and 2 show a preferred embodiment but not the only embodiment in which this invention may be incorporated. The thermostat 11 includes generally a base 12 which carries a stack 13. The stack 13 is formed from a hollow rivet 14 which has a head 15 adapted to abut the frame 16 of an electrical appliance, the temperature of which it is to control. The thermostat 11 may be fixed to this frame 16 by a headed screw 17 which engages a shoulder 18 recessed in the bore of the hollow rivet 14. This provides a compressive force on the stack 13 which is directly along the axis 19.

The stack 13 carries first and second contact blades 21 and 22 and a bimetal blade 23. These blades are resilient and the contact blades 21 and 22 are insulated from the stack by ceramic insulating washers 24, 25 and 26. A steel spacer washer 27 is positioned contiguous to the bimetal blade 23 to establish a pre-determined free length of the bimetal blade 23. The ceramic insulating washers are usually not as flat as steel washers and if just the ceramic washer 26 were to engage the bimetal blade 23, the free length of the bimetal blade 23 would not be as readily determined.

The mounting of the contact blade 21 and bimetal blade 23 establishes an effective hinge line thereof as at 28 and 29, respectively, which is closely adjacent the stack 13. A reference line 30 may be drawn through these hinge lines 28 and 29 and this reference line 30 is generally parallel to the axis 19 of the rivet 14. The first contact blade has stiffening ribs 31 pressed therein on each side of the blade to stiffen this blade. The second contact blade 22 also has stiffening ribs 32 longitudinally along each side of the blade.

The base 12 carries a nut 33 which is internally threaded to receive an adjusting screw 34. This screw 34 may carry a knob, not shown, for adjustment by a person to achieve a pre-set temperature of the electrical appliance 16. The adjusting screw 34 carries an insulating tip 35 loosely passing through a screw aperture 36 in the first contact blade 21. This insulating tip 35 engages a partially spherical socket 37 in the second contact blade 22. This second contact blade 22 is resiliently biased by the mounting thereof in the stack 13 upwardly toward this insulating tip 35.

The first contact blade 21 carries a first contact 41 on the outboard end thereof and the second contact blade 22 carries a second contact 42 on the outer end thereof for cooperation with the first contact 41. An insulating push link 44 extends between the first contact blade 21 and the bimetal blade 23. As better shown in the enlarged view of FIGURE 3, which shows a modified first contact blade 21A, this push link 44 may be an insulating material such as ceramic. This push link 44 extends loosely through an aperture 45 in the second contact blade 22. This push link has an upper tongue 46, see FIGURE 4, and a lower tongue 47. The link 44 is relatively thin in a longitudinal dimension as assembled in the thermostat and relatively wide in a lateral dimension, as shown in FIGURES 3 and 4. The upper tongue 46 is relatively closely received longitudinally in a socket aperture 48 in the first contact blade 21 and is relatively closely received longitudinally in a socket aperture 49 in the bimetal blade 23. The bimetal blade 23 has a partially cylindrical convex surface 50 at the socket aperture 49 and the push link has shoulders 51 and 52 laterally on each side of the lower tongue 47 to rest on this cylindrical convex surface 50. The surface 50 being convex and the shoulders 51 and 52 being flat or planar, establish a line contact as at 53 therebetween. Shoulders 54 are provided at the upper end of the push link 44 on each side of the upper tongue 46 to engage the first contact blade 21 in a line contact on each side of the socket aperture 48. In the modified form of FIGURE 3, the modified first contact blade 21A has about a ten degree bend 56 at the area of the socket aperture 48. In the FIGURES 3 and 4, the shoulders 54 have been shown as not engaging the first contact blade 21A. This would be the condition at room temperature for the thermostat 11 adjusted for a temperature considerably above room temperature. Upon initial energization of electrical appliance 16 through the thermostat contacts, the appliance would heat to transmit heat to the bimetal blade 23. This bimetal blade would then warp or bend upwardly about the effective hinge line 29. The push link 44 would thus also move upwardly and at some point, the shoulders 54 would engage the first contact blade 21 or 21A. A line contact would be established thereat between the inner longitudinal edge 57 of the shoulders 54 and the first contact blade. Upon further upward movement of the bimetal blade 23, this would open the contacts 41 and 42 to de-energize the appliance 16. In the modified form shown in FIGURE 3, the ten degree bend 56 helps assure that the push link 44 will be at the outer longitudinal edge of the socket aperture 48. In the embodiment in FIGURE 2, this also is generally true because as the first contact blade 21 is pushed upwardly by the push link 44, the first contact blade 21 slopes upwardly to the right as viewed in FIGURE 2 to assure that the push link 44 engages the first contact blade 21 at the inner longitudinal edge 57.

A line contact is thus established between the push link 44 and the bimetal blade 23 and between the push link 44 and the first contact blade 21 or 21A. These line contacts are at a fixed distance from the stack 13 or from the reference line 30 and, thus, the thermostat 11 has exceptional repeatability and a definite range of temperature differential cycling. The FIGURE 5 shows a first graph 61 of temperature vs. time of a prior art thermostat such as my prior thermostat shown in U.S. Patent 2,740,-020, issued March 27, 1956. FIGURE 5 also shows a second graph 62 of the present thermostat 11. The first graph 61 is of a prior art thermostat wherein the bimetallic blade was longer and carried on the outer end thereof fixedly mounted a ceramic insulating tip. The upper end of this tip engaged and moved upwardly the outer end of the first contact blade outboard of the first contact. As this bimetallic blade moved upwardly by temperature changes, the upper end of the insulating tip engaged the first contact blade to deflect same. There was a considerable amount of friction between the ceramic tip and the first contact blade because this tip moved in a longitudinal direction sliding over the underside of this first contact blade. Therefore, the bimetallic blade had to do more work to overcome this friction.

The curves 61 and 62, comparing the prior art thermostat of applicant's Patent 2,740,020 with the thermostat of the present invention, show two noticeable improvements. In the curve 61 there is an initial overshoot 63 of about 40 degrees above the mean temperature and this for only a low setting of temperature. By contrast, curve 62 shows an initial overshoot 64 of only about 25 degrees above the mean temperature setting. Additionally, the prior art curve 61 shows a temperature cycling of about 25 degrees between off and on, as at 65. This is the temperature differential. The curve 62 of the present thermostat shows a temperature differential 66 of about 15 degrees between off and on conditions. The curves 61 and 62 also show a superiority of the present design for medium and high temperature settings of the two thermostats. The prior art thermostat and the thermostat of the present invention were actually tested in the same electrical flat iron to produce the graphs 61 and 62 of FIGURE 5 so that these curves may be directly compared.

A reason for the marked superiority of the present invention is that applicant has achieved a friction-free thermostat. The push link 44 is loosely but positively interengaged at each end with the first contact blade 21 and with the bimetal blade 23. Also, a single line contact is achieved with each of these blades. Still further, this line contact remains at the same point and at the same distance from the reference line 30 as the bimetal blade 23 deflects and moves the first contact blade 21. It will be noted that the push link 44 remains substantially parallel to the reference line 30 during upward deflection of the two blades 21 and 23 and, thus, this push link 44 has a generally parallelogram movement. This maintains a fixed length of lever arm on the bimetal blade 23 and on the first contact blade 21. This has two advantages, it maintains the temperature differential small and uniform, as shown at 66. Also, it aids the repeatability in that if the adjusting screw 34 is moved to a new temperature and then returned to the former setting, the thermostat will achieve a temperature of the electrical appliance the same as that at which it was previously set.

Because the thermostat 11 has eliminated friction, especially between the ceramic push member 44 and the first contact blade 21, the bimetal blade 23 does not have to work as hard in order to actuate the contact 21. Thus, the bimetal blade may be made shorter and may now be shorter than the first contact blade 21. It may also be made more active to have a greater deflection per degree of temperature change. It may also be made thinner and the fact that it is both thinner and shorter has two distinct advantages. There is considerably less mass of bimetal blade to be heated and also the heat does not need to travel as far from the frame 16 through the rivet head 15 to the tip of the bimetal blade 23 in order to actuate same. Accordingly, this acts cumulatively for faster actuation of the thermostat, the smaller overshoot 64 and the smaller temperature differential 66.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A thermostat comprising in combination, a base,
a bimetallic blade carried on said base as a cantilever,
a first movable contact carried on said base,
a second contact carried on said base for cooperation with said first contact,
a push link extending between said bimetal blade and said first contact,
socket aperture means in said bimetal blade,
tongue means on one end of said push link engaging said socket aperture means with close tolerance in a longitudinal direction, a convex surface on said bimetal blade laterally adjacent said socket aperture means, and a flat surface on said push link engaging said convex surface to establish substantially a line contact along a single straight line therebetween to establish a fixed length of lever arm on said bimetal blade throughout the operating range of movement thereof.

2. A thermostat comprising in combination, a base, a bimetallic blade carried on said base as a cantilever, a first movable contact carried on said base, a second contact carried on said base for cooperation with said first contact, a push link extending between said bimetal blade and said first contact, said push link as assembled in said thermostat being wide in a dimension transverse to said bimetal blade and being thin in a dimension longitudinal of said blade, an aperture in said bimetal blade, a tongue on one end of said push link engaging said aperture with close tolerance in a longitudinal direction, a partially cylindrical convex surface on said bimetal blade laterally on each side of said tongue aperture, and a flat surface on said push link on each side of said tongue engaging said cylindrical convex surfaces to establish substantially a line contact along a single straight line therebetween to establish a fixed length of lever arm on said bimetal blade throughout the operating range of movement thereof.

3. A thermostat comprising in combination, a base, a resilient contact blade and a bimetallic blade carried on said base as cantilevers, a first contact carried on the outboard end of said contact blade, a second contact carried on said base for cooperation with said first contact, a push link extending between said blades, said push link as assembled in said thermostat being wide in a dimension transverse to said blades and being thin in a dimension longitudinal of said blades, an aperture in each said bimetal and contact blades, a tongue on each end of said push pink within said apertures with close tolerance in a longitudinal direction, a partially cylindrical convex surface on said bimetal blade laterally on each side of said tongue aperture, and a flat surface on said push link on each side of said tongue engaging said cylindrical convex surfaces to establish substantially a line contact along a single straight line therebetween to establish a fixed length of lever arm on said bimetal blade throughout the operating range of movement thereof.

4. A thermostat comprising in combination, a base, a bimetallic blade carried on said base as a cantilever, a first movable contact carried on said base, a second contact carried on said base for cooperation with said first contact, a push link extending between said bimetal blade and said first contact, said push link as assembled in said thermostat being wide in a dimension transverse to said bimetal blade and being thin in a dimension longitudinal of said blade, socket aperture means in said bimetal blade, tongue means on one end of said push link engaging said socket aperture means with close tolerance in a longitudinal direction, a partially cylindrical convex surface on said bimetal blade laterally adjacent said socket aperture means, and a flat surface on said push link engaging said cylindrical convex surface to establish substantially a line contact along a single straight line therebetween to establish a fixed length of lever arm on said bimetal blade throughout the operating range of movement thereof.

5. A thermostat comprising in combination, a base, a resilient contact blade and a bimetallic blade carried on said base as cantilevers, a first contact carried on said contact blade, a second contact carried on said base for cooperation with said first contact, a push link, means to loosely interconnect said push link with each said bimetal blade and said contact blade at a substantially fixed lever arm distance to transfer movements of said bimetal blade to said contact blade upon temperature changes to actuate said first contact into and out of engagement with said second contact.

6. A thermostat comprising in combination, a base, a resilient contact blade and a bimetallic blade carried on said base as cantilevers, a first contact carried on the outboard end of said contact blade, a second contact carried on said base for cooperation with said first contact, a push link, means to loosely interconnect said push link with each said bimetal blade and said contact blade to transfer bending movements of said bimetal blade to said contact blade upon temperature changes to actuate said first contact into and out of engagement with said second contact, and means including said loose interconnection of said push link with each said bimetal blade and said contact blade to establish a fixed length of lever arm on both said bimetal blade and said contact blade throughout the operating range of bending movements of each blade.

7. A friction-free thermostat comprising in combination, a base, a resilient contact blade and a bimetallic blade mounted on said base, a first contact carried on the outboard end of said contact blade, a second contact disposed for cooperation with said first contact, a push link, means to loosely connect said push link to each said bimetal blade and said contact blade to transfer bending movements of said bimetal blade to said contact blade upon temperature changes to actuate said first contact into and out of engagement with said second contact, said push link extending generally perpendicularly to both said bimetal blade and contact blade to move in a generally parallelogram movement.

8. A friction-free creep action thermostat comprising in combination, a base, a resilient contact blade and a bimetallic blade carried on said base, a first contact carried on the outboard end of said contact blade, a second contact disposed for cooperation with said first contact, a socket in the outboard end of said bimetal blade, a socket in said contact blade inboard of said first contact, a push link extending between and engaging said sockets in said bimetal blade and in said contact blade to transfer bending movements of said bimetal blade to said contact blade upon temperature changes to actuate said first contact into and out of engagement with said second contact, said bimetal blade having a small cylindrical bulge toward said contact blade at said socket, said small cylindrical bulge causing said push link to engage said bimetal blade at substantially only a line contact at said socket to maintain a predetermined lever arm length of said bimetal blade during deflection thereof.

9. A friction-free creep action thermostat comprising in combination, a base,
first and second resilient contact blades and a bimetallic blade carried in that order on said base,
a screw threaded relative to said base,
said first contact blade having a screw aperture,
said second contact blade having a screw socket,
said screw extending through said aperture to bear against said screw socket and adjustably position said second contact blade,
first and second contacts carried on said first and second resilient contact blades, respectively, at the outboard ends thereof for mutual cooperation,
the mounting of said contact blades urging said contacts toward engagement,
a link aperture in said second contact blade between said screw socket and said second contact,
a socket aperture in the outboard end of said bimetal blade,
a socket aperture in said first contact blade between said screw aperture and said first contact,
a push link extending in spaced relationship through said link aperture in said second contact blade and engaging said socket apertures in said bimetal blade and in said first contact blade to transfer bending movements of said bimetal blade to said first contact blade upon temperature changes to actuate said first contact into and out of engagement with said second contact,
said bimetal blade having a small cylindrical bulge toward said first contact blade at said socket aperture,
said small cylindrical bulge causing said push link to have substantially a line contact with said bimetal blade to maintain a predetermined lever arm length of said bimetal blade during deflection thereof.

References Cited by the Examiner
UNITED STATES PATENTS

| | | | |
|---|---|---|---|
| 1,886,439 | 10/1932 | Wells | 200—138 |
| 2,735,912 | 2/1956 | Ulanet | 200—138 |
| 2,768,263 | 10/1956 | Callihan | 200—138.2 |
| 2,824,193 | 2/1958 | Rosen et al. | 200—138 |
| 2,991,341 | 5/1961 | Ulanet | 200—138 |

FOREIGN PATENTS

| | | |
|---|---|---|
| 889,637 | 9/1953 | Germany. |
| 641,185 | 8/1950 | Great Britain. |

OTHER REFERENCES

German application, Ser. No. 1,077,333, January 18, 1957.

BERNARD A. GILHEANY, *Primary Examiner.*